United States Patent [19]

Benesh

[11] Patent Number: 4,784,568

[45] Date of Patent: Nov. 15, 1988

[54] WIND TURBINE SYSTEM USING A VERTICAL AXIS SAVONIUS-TYPE ROTOR

[76] Inventor: Alvin H. Benesh, 120 South Adams Ave., Pierre, S. Dak. 57501

[21] Appl. No.: 69,405

[22] Filed: Jul. 1, 1987

[51] Int. Cl.$^4$ .............................................. F03D 7/06
[52] U.S. Cl. ......................................... 415/3; 415/4; 416/197 A; 416/DIG. 9
[58] Field of Search .................. 416/197 A; 415/4 R, 415/2 R-3 R

[56] References Cited

U.S. PATENT DOCUMENTS

| | | |
|---|---|---|
| 274,541 | 3/1883 | Zweibel . |
| 410,360 | 9/1889 | Ham . |
| 434,108 | 8/1890 | Gatlin . |
| 607,668 | 7/1898 | Tinsley . |
| 764,571 | 7/1904 | Fisher . |
| 923,698 | 6/1909 | Perry . |
| 973,823 | 10/1910 | Stamm . |
| 1,300,499 | 4/1919 | Slagel . |
| 1,455,950 | 5/1923 | Willman . |
| 1,534,799 | 4/1925 | Maine . |
| 1,596,373 | 8/1926 | Preston . |
| 1,766,765 | 6/1930 | Savonius ............... 416/197 A X |
| 1,790,175 | 1/1931 | Spencer . |
| 2,007,963 | 7/1935 | Cleveland ............. 416/197 A X |
| 3,895,882 | 7/1975 | Moyer . |
| 4,005,947 | 2/1977 | Norton et al. ............. 416/197 A |
| 4,039,849 | 8/1977 | Mater et al. ............ 416/197 A X |
| 4,115,028 | 9/1978 | Hintze . |
| 4,204,795 | 5/1980 | Forrest . |
| 4,278,896 | 7/1981 | McFarland . |
| 4,288,200 | 9/1981 | O'Hare . |
| 4,315,713 | 2/1982 | Verplanke . |
| 4,359,311 | 11/1982 | Benesh ...................... 416/197 A |
| 4,362,470 | 12/1982 | Locastro et al. ........... 416/197 A |
| 4,428,711 | 1/1984 | Archer . |
| 4,449,887 | 5/1984 | Mundhenke . |
| 4,474,529 | 10/1984 | Kinsey ........................ 415/4 R X |
| 4,652,206 | 3/1987 | Yeoman ..................... 415/4 R |

FOREIGN PATENT DOCUMENTS

| | | |
|---|---|---|
| 1123341 | 5/1981 | Canada . |
| 37015 | 1/1927 | Denmark . |
| 25023 | 3/1981 | European Pat. Off. . |
| 821930 | 11/1951 | Fed. Rep. of Germany ..... 415/4 R |
| 1628140 | 2/1970 | Fed. Rep. of Germany ... 416/197 A |
| 1916460 | 10/1970 | Fed. Rep. of Germany ..... 415/4 R |
| 658943 | 6/1929 | France ........................ 416/197 A |
| 727519 | 6/1932 | France ........................ 416/197 A |
| 797106 | 4/1936 | France ........................ 416/197 A |
| 1048392 | 12/1953 | France . |
| 2286955 | 4/1976 | France ............................ 415/4 R |
| 2431041 | 3/1980 | France . |
| 2522074 | 8/1983 | France ............................ 415/4 R |
| 145464 | 7/1985 | Japan ......................... 416/197 A |
| 65940 | 12/1924 | Sweden ....................... 416/197 A |

OTHER PUBLICATIONS

Chang, Howard H. and McCracken, Horace, "Bucket Rotor Wind-Driven Generator" from *Wind Energy Conversion Systems*, p. 27.

Hackelman, Michael, "The Savonius Super Rotor", reprinted from the *Mother Earth News*, No. 183.

Park, Jack, "Wind Machine Design", from *The Wind Power Book*, Cheshire Books, 1981.

Newsletter One, A Supplement to Wind and Windspinners, Jul. 1975.

Savonius, S. J., "The S-Rotor and its Applications," reprinted from Mechanical Engineering, May, 1931, vol. 53, No. 5.

Vance, W., "Vertical Axis Wind Rotors–Status and Potential," from Wind Energy Conversion Systems, pp. 28–30.

*Primary Examiner*—Everette A. Powell, Jr.
*Attorney, Agent, or Firm*—Merchant, Gould, Smith, Edell, Welter & Schmidt

[57] ABSTRACT

The present invention relates to a combination of a vertical axis Savonius-type rotor (20) and a deflector assembly (100) which serves as an augmentation apparatus which considerably increases the power output of the Savonius-type rotor and also improves its self-starting ability and smoothness of operation. The invention also provides a fantail member (120) to properly position the deflector assembly. In connection with the rotor-deflector combination, the present invention also teaches a simple, automatic speed control apparatus (130) which allows the combination to withstand high speed winds and produce power at the same time.

22 Claims, 4 Drawing Sheets

WIND TURBINE SYSTEM USING A VERTICAL AXIS SAVONIUS-TYPE ROTOR

BACKGROUND OF THE INVENTION

The present invention relates to the combination of a vertical axis Savonius-type rotor, a deflector plate device which serves as an augmentation apparatus that considerably increases the power output of the Savonius-type rotor and also improves its self-starting ability and smoothness of operation, and a fantail member to correctly orientate the deflector plate device. In connection with the above combination, the invention also features a simple, automatic speed control mechanism which can be used to control the speed of the rotor in high winds.

As used in this application, the term "Savonius rotor" includes rotors having a shape as generally illustrated in this application and in U.S. Pat. No. 4,359,311, as well as rotors with two or more blades of the classic Savonius type, wherein the rotor blades are generally semi-cylindrical in shape. This is in contrast to turbines which have the inner edges of the blades fixed to adjoining blades or to a central core, drum or shaft in such a manner that there can be practically no crossing of the fluid past the inner edges of the blades.

High speed propellor-type turbines have dominated the wind energy field largely because of their relatively high efficiency. Slow speed turbines such as the Savonius vertical axis turbine or the multi-blade horizontal axis windmill used for pumping water have typically been of low efficiency and cannot compete with the high speed propellor type for electrical power production. In addition to other disadvantages, however, there are some places where the high speed propellor-type turbine cannot be installed. For example, such a turbine cannot be placed on top of large area flat buildings because the wind would be too unstable, and also the turbines would be too dangerous. With the high speed turbine, safety is an important consideration, and since metal fatigue is related to the number of stress reverses of high magnitude, it is difficult to predict when a blade may come loose from the turbine.

As indicated in applicant's U.S. Pat. No. 4,359,311, Savonius-type rotors have well-known problems associated therewith. For example, they have low starting torque when oriented at certain directions and their action is jerky and pulsating under a load.

The present invention provides the combination of a two-blade Savonius-type rotor of considerably improved efficiency, and considerably better self-starting characteristics than the classic semicylindrical-blade two-blade rotor, a deflector plate which gives operating improvement to the rotor, in addition to considerably increasing the power output, and a fantail member for keeping the deflector plate in the most advantageous position. In addition, the present invention provides a speed regulator mechanism for protecting the rotor in high winds, while producing power at the same time. The two-blade Savonius-type rotor used in the present invention is set out in applicant's U.S. Pat. No. 4,715,776.

The present invention solves the above problems as well as other problems associated with existing designs.

SUMMARY OF THE INVENTION

The present invention provides for a vertical axis Savonius-type rotor having at least two blades and being mounted on a support framework. The present invention also provides for a deflector member extending along the height of the rotor and fantail means extending outward from the support framework and interconnected to the deflector member so that the wind acting on the fantail means will position the deflector member on the side of the rotor facing the direction from which the wind is flowing. The present invention provides for rotatably mounting the deflector member and fantail means to the support framework so that the deflector member and fantail member rotate about the central vertical axis of the rotor in a fixed relationship to each other.

A particularly advantageous feature of the present invention is the provision for a vertical axis Savonius-type turbine of increased efficiency in combination with a simple, inexpensive augmentation device which increases the output of the rotor significantly and a fantail member which keeps the augmentation device properly oriented. The system of this invention is designed for locations where only a moderate amount of power is needed, and where there is a special need for power which is safe, reliable, convenient and troublefree.

While the augmented Savonius-type rotor still has some economic disadvantage of requiring a large amount of material, the construction thereof is of relatively low technology, and the augmented rotor's high efficiency goes far toward overcoming this deficiency.

The present invention is also advantageous in that it exhibits greater reliability than propellor-type devices and, in consequence, will have a much longer service life. It is intended that with the preferred embodiment, generally, the only attention that will be required in the present invention is occasional lubrication of anti-friction bearings. Maintenance will be low due to relatively few moving parts. The occasional maintenance that the gear boxes and alternators of the present invention will require can be conveniently performed because these boxes and alternators are, in the preferred embodiment, at ground level. Accordingly, the cost of the present invention over its lifetime will be substantially reduced.

Another advantage of the preferred embodiment of the present invention is that the operation of the present invention can be quite noiseless, as the gears and fast-rotating elements are at ground level and, therefore, easy to sound-proof. Also, sounds at ground level do not carry as far.

The present invention provides for an improved design for a Savonius-type rotor which is significantly more efficient than the usual type of existing two-blade Savonius-type rotor. This design is set out in applicant's U.S. Pat. No. 4,715,776. The rotor blade surfaces of the Savonius-type rotor average a much closer distance to an imaginary plane passing through the rotor axis and the edges of the rotor blades at the rotor tips than previous designs.

In the preferred embodiment of the present invention, the augmented Savonius-type rotor is configured for rotation about a vertical axis.

In the preferred embodiment, a deflector plate is placed in front of a two-blade Savonius-type rotor so as to act as an augmentation device wherein the action of the Savonius-type rotor becomes quite smooth, starting is made possible at nearly a full load with the wind from any direction relative to the orientation of the rotor blades. The two-blade Savonius-type rotor of the present invention is particularly adapted to augmentation by the deflector plate of the preferred embodiment, so as to enable improvement in its performance characteristics.

The preferred embodiment of the present invention includes a fantail member for positioning the deflector member at the correct angle with the wind direction. Many rotors have fantails which are designed to make approximately a 0° angle with the wind direction when the rotor is in the most advantageous position with respect to the wind. With the deflector member of the present invention, the action of the wind against the deflector member is such that there is always a force on the deflector causing torque in yaw and the fantail makes an angle with the wind to balance this torque in order to keep the deflector constantly oriented at the correct position relative to the wind.

Yet another advantageous feature of a preferred embodiment of the present invention is the provision for a speed control apparatus. In addition to other advantages, this feature enables the speed of the rotor to be automatically controlled. In the preferred embodiment, the speed control apparatus includes a biasing mechanism attached to the deflector plate to hold the deflector plate in its most efficient position, at a 90° angle relative to the direction of the wind. When the wind increases sufficiently, it overcomes the biasing force and rotates the deflector plate about its vertical axis to a position where the deflector plate does not make a 90° angle with the direction of the wind. Accordingly, the speed of the rotor is reduced because the deflector plate in this position deflects some of the wind away from the rotor. Also, the rotation of the deflector member on its axis causes the entire deflector mechanism to rotate about the vertical axis of the rotor to a position where even more of the wind is directed away from the rotor. Accordingly, the speed of the rotor is reduced. The speed control mechanism of the present invention allows the rotor to weather winds of gale force without damage, producing power at the same time.

As previously discussed, a particularly advantageous feature of the present invention is the large increase in power made possible by use of the augmentation device in conjunction with the Savonius-type rotor. In the preferred embodiment, the augmentation device includes a vertically orientated flat deflector plate with a curved portion adjacent an inner edge of the deflector plate positioned in front of the rotor on the side of the rotor from which the wind is blowing. Accordingly, the augmentation device exhibits extreme simplicity, ease of construction, conservation of materials and low cost, relatively slight space requirements for operation, and ease of adjustment. A critical dimension of the deflector plate is the placement of the inner edge of the deflector plate, the edge which is closest to the rotor axis. This inner edge must be positioned to the side of a horizontal line drawn through the central vertical axis of the rotor parallel to the direction of fluid flow such that the entire deflector plate is to the side of this line. With any variation from the optimum position, the efficiency falls off rapidly.

Additionally, the applicant has discovered that the vertical height of the deflector with respect to the rotor makes a considerable difference. If the deflector height is no greater than the rotor height, a significant portion of the wind spills past the top and bottom and does not go through the rotor. This situation is somewhat analagous to that of an airplane wing. Wings that have a higher aspect ratio have better lift curve slopes. Pragmatically, in the preferred embodiment, the deflector plate is extended a distance of one-quarter the rotor diameter on each end of the rotor.

In the preferred embodiment of the present invention, the rotor is mounted on a stationary tube which is supported by a tower which extends to the ground. This stationary tube extends almost half way up the axis of the rotor and has a thrust bearing at the top through which the central shaft of the rotor rotates. This puts nearly all of the bending moment on the stationary tube so that the central shaft of the rotor is needed to resist bending moments only in a minor amount. A torque tube extending from the stationary tube to the alternators at ground level also takes no bending moment, so it can be quite small.

In the preferred embodiment of the present invention, the rotor blades are held in the correct shape by flat braces. One stronger central flat brace not only holds the rotor blades in the correct shape but also is firmly fastened to the central shaft whereby it is the main support of the rotor in addition to transmitting the torque from the rotor blades to the shaft.

These and various other advantages and features of novelty which characterize the present invention are pointed out with particularity in the claims annexed hereto and forming a part hereof. However, for a better understanding of the invention, its advantages and object attained by its use, reference should be had to the drawings which form a further part hereof, and to the accompanying descriptive matter, in which there is illustrated and described a preferred embodiment of the present invention.

BRIEF DESCRIPTION OF THE DRAWINGS

In the drawings, in which like reference numerals and letters indicate corresponding parts throughout the several views.

DETAILED DESCRIPTION OF THE PREFERRED EMBODIMENT

Figure 1:
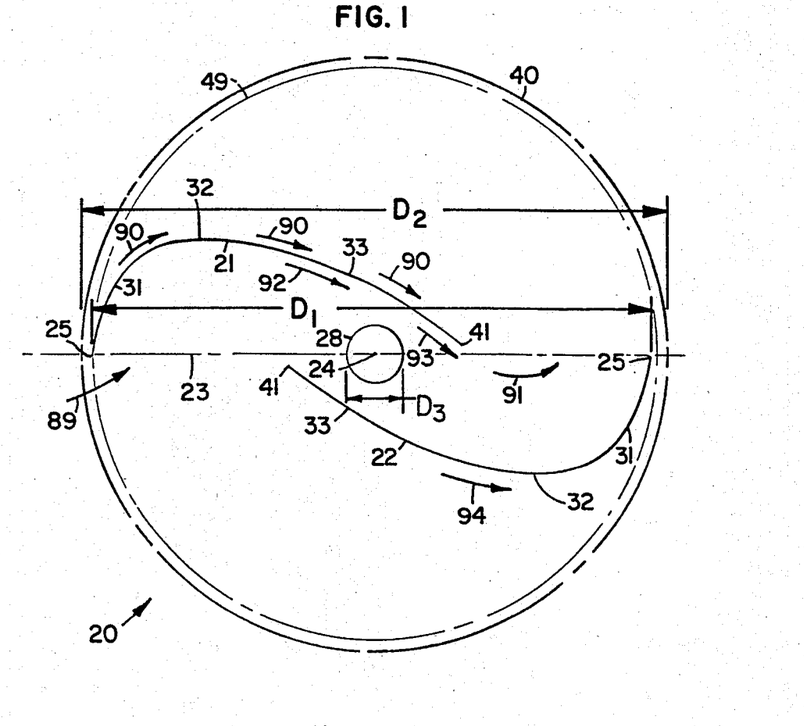
FIG. 1 is a diagrammatic view of a preferred embodiment of a two-blade Savonius-type rotor in accordance with the principles of the present invention.
Figures 2, 4:
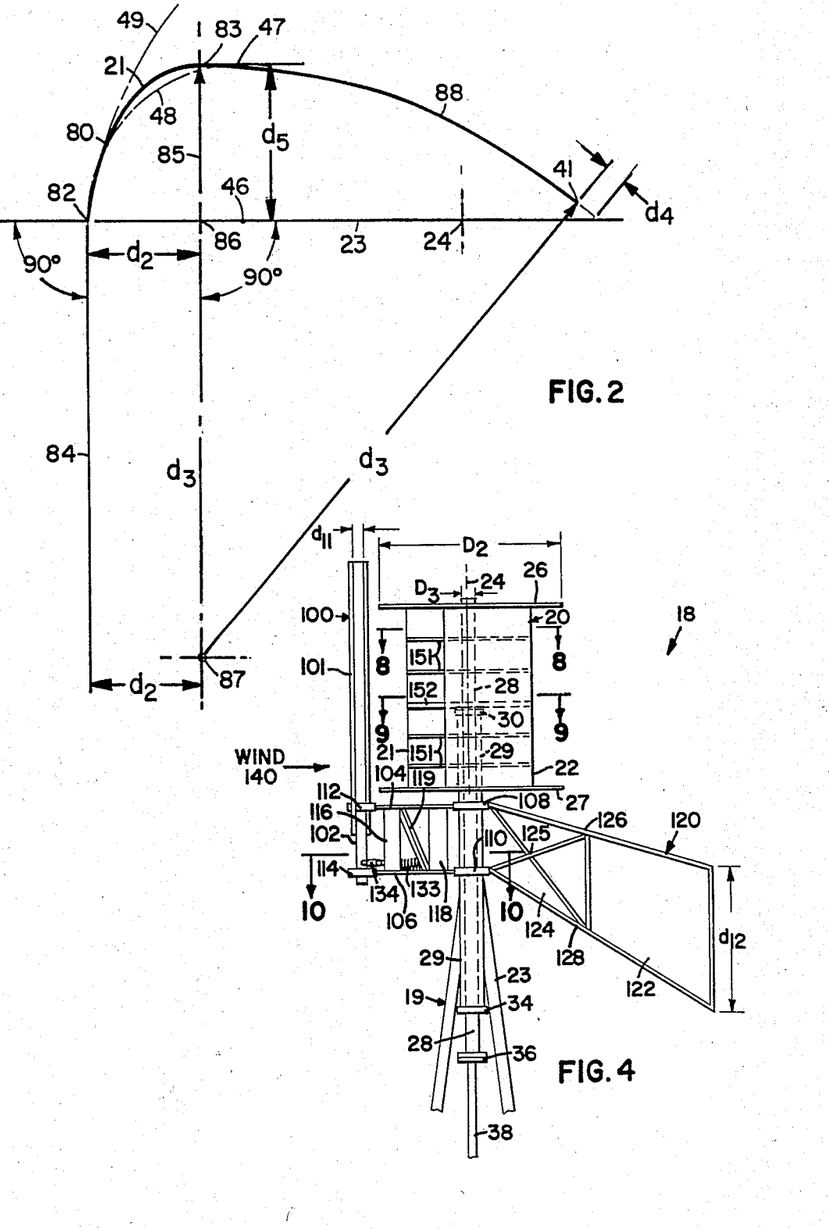
FIG. 2 is a diagrammatic view of a rotor blade of the embodiment shown in FIG. 1.
FIG. 4 is a side elevational view of an embodiment of a two-blade vertical Savonius-type rotor similar to that of FIG. 1 with an augmentation device including a vertical plate which is flat in cross-section except for the edge nearest the rotor, which is curved.

Referring now to the drawings, there is illustrated in FIGS. 1–2 a preferred embodiment of a two-blade Savonius-type rotor in accordance with the principles of the present invention. This two blade Savonius-type rotor is set out in applicant's U.S. Pat. No. 4,715,776. The description of the rotor will be repeated here for convenience. The rotor of the present invention has a vertical axis of rotation, unlike the rotor in U.S. Pat. No. 4,715,776 which has a horizontal axis, and is generally designated by the reference numeral 20. Illustrated in FIGS. 4–10 is an embodiment of a rotor assembly including the two-blade Savonius-type rotor 20 utilized with an embodiment of a deflector assembly 100, a fantail member 120 and a speed control mechanism 130 in accordance with the principles of the present invention, the rotor assembly being generally designated by the reference numeral 18. The rotor assembly 18 includes the vertical axis, two-blade Savonius-type rotor 20 mounted on a support structure 19.

The rotor 20 includes two substantially identical blades 21,22 as generally diagrammatically illustrated in FIG. 1. The blades 21,22 are positioned for rotation about a central axis 24, which is substantially vertical in the embodiment shown. An imaginary plane 23 is shown passing through the vertical central axis 24 and outer blade tips 25. It will be appreciated that, as illustrated in FIG. 1, the blades 21,22 are positioned much closer to the imaginary plane 23 than other Savonius-type rotor designs.

Figure 5:
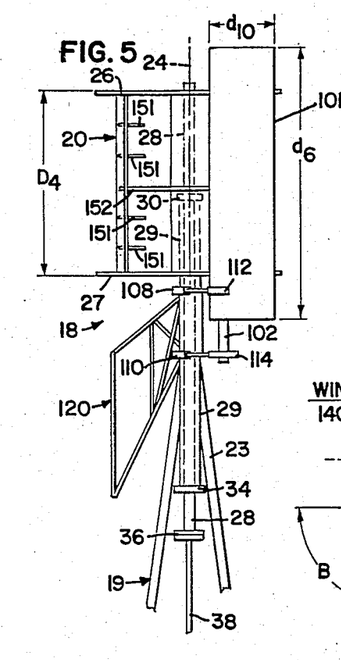
FIG. 5 is a front elevational view of the embodiment shown in FIG. 4.
Figure 6:
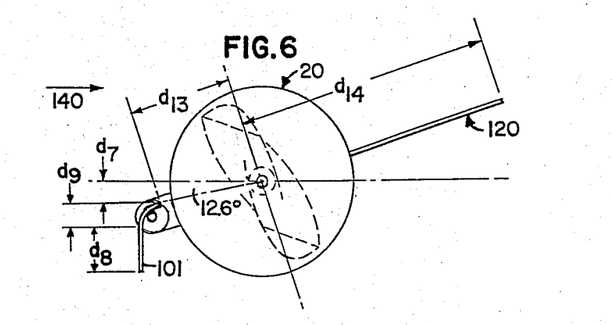
FIG. 6 is a top plan view of the embodiment shown in FIG. 4.

As illustrated in FIGS. 4 and 5, the preferred embodiment of the rotor assembly 18 of the present invention includes a circular end cap 26 at the top of the rotor 20 and a similar circular end cap 27 at the bottom of the rotor 20. The end caps 26,27 are interconnected by the blades 21,22 which are disposed symmetrically about the vertical central axis 24. End cap 26 is firmly fastened to central shaft member 28, which may be either hollow or solid. It will be appreciated that the rotor 20 may be arranged for rotation with respect to stationary tube 29, which extends through a hole cut in end cap 27 of rotor 20, in any suitable fashion. The hole in end cap 27 must be large enough to permit end cap 27 to rotate freely without touching stationary tube 29. In the preferred embodiment, the central shaft 28 rotates through a thrust bearing 30 at the top of stationary tube 29.

As illustrated in FIG. 1, each of the blades 21,22 has an outer edge or tip 25 which is preferably sharply pointed to provide better aerodynamic characteristics for the blades 21,22 and an inner edge or tip 41 with respect to the central axis 24. The inner edge 41 is near the imaginary plane 23. Each of the blades 21,22 has a first curved portion 31 from the outer edge 25 to a point 32 generally in the direction of the inner edge 41 and a second curved portion 33 which is tangent to the first curved portion 31 at the location 32. The second curved portion 33 is an arc of a circle of relatively large radius in the preferred embodiment, although alternatively, the section can have a curve of varying radii from one end to the other and hence need not be the arc of a circle. The curves of the blades 21,22 define surfaces that are generally concave with respect to the central axis 24.

The outer edge 25 of each blade 21,22 lies on the circumference of a circle 49 with a diameter $D_1$ whose magnitude is variable since it is contemplated that the rotor 20 may be constructed in various sizes. The circle 49 is centered on central axis 24 and defines the outer periphery of the blades 21,22. For purposes of this specification, measurements of the preferred embodiment will be expressed in terms of diameter $D_1$.

Each of the blades 21,22 is attached to the end caps 26,27 as shown in FIGS. 4 and 5. Each of the end caps 26,27 has an outer periphery 40, as illustrated in FIG. 1, which forms a circle having a diameter $D_2$ which in the preferred embodiment is 1.05 $D_1$. The circle 40 is centered about the central axis 24.

The geometric configuration of a preferred embodiment of the blades 21,22 will now be described more particularly, referring specifically to FIGS. 1 and 2.

The curved portion 31 of each of the blades 21,22 in cross-section forms a curve 80 as generally illustrated in FIG. 2, which extends from a point 82 at the outer edge 25 of each of the blades 21,22 to a point 83 where the curved portion 31 is substantially tangent to the curved portion 33 which forms the curve 88 in FIG. 2. If the curved portion 88 or blade portion 33 is a straight line parallel to the plane 23, the location 32 or point 83 will be at the same location. However, if the blade portion 33 is at an angle directed toward the plane 23, the point of tangency will be slightly to the right of where it now is. The curved portion 31, represented by curve 80 in FIG. 2, is laid out in a similar manner to that described in U.S. Pat. No. 4,359,311, wherein the point of tangency 83 is closer to the circle 49 than that of a circular arc 48 which is tangent with the curve 88 at a point 47 and which is also tangent to the circle 49 at point 82, the circular arc 48 having its center at a point 46 on the plane 23. However, it is different in that the dimensions are larger in relation to the diameter of the rotor, and the connecting curve 88 is tangent to the curve 80 at a slightly different point. The curve portion 80 has a progressively decreasing curvature toward the outer edge 25 of the blades 21,22. At the outer edge 25, the radius of curvature is quite large. The radius of curvature gets progressively shorter and is shortest at the top of the curve. This is a characteristic of an ellipse.

The maximum displacement of the blades from the plane 23 is preferably less than $0.25D_1$ and most preferably $0.2D_1$ and it occurs at location 32 in FIG. 1 or point 83 in FIG. 2. If the inner edge 41 of the blade portion 33 were extended on a surface containing the inner edge 41 and the plane 23, the blade portion 33 will preferably cross the plane 23 at a location between $0.05D_1$ and $0.33D_1$ from the axis 24. The inner edge 41 is preferably at a distance no greater than $0.1D_1$ from either side of the plane 23, measured perpendicular to the plane 23.

Figure 3:
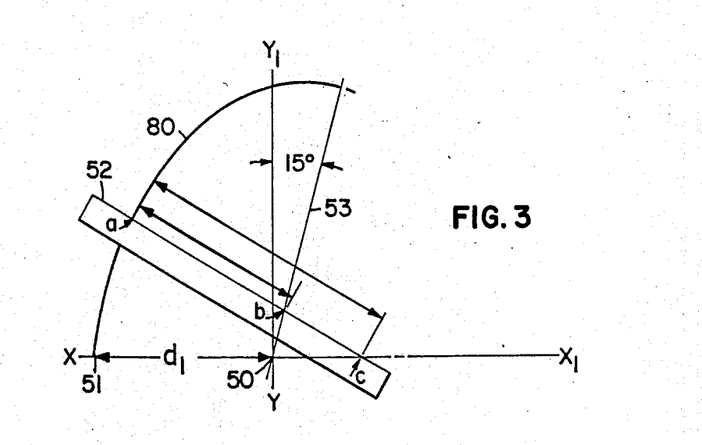
FIG. 3 illustrates a method for tracing the outer curved portion of the blades of the embodiment shown in FIG. 1.

As generally discussed in U.S. Pat. No. 4,359,311, hereby incorporated by reference, a pragmatic way of defining the profile of the curve 80 is illustrated in FIG. 3. The curve 80 is nearly one quadrant of a skewed ellipse whose major axis is one and one-half times its minor axis and whose major axis is on a 15° skew. The curve 80 is drawn by defining axis $X-X_1$ which is at right angles to an axis $Y-Y_1$ and which passes through the central axis 24 of the rotor 20. A point 50 and a point 51 are located on the axis $X-X_1$ such that the point 50 is a distance $d_1$ which in the preferred embodiment is $0.133D_1$ from point 51. Distance $d_1$ represents one-half the minor axis of a skewed ellipse. A straight edge 52 is marked with graduations a, b, and c, such that the distance from a to b is $0.133D_1$ and the distance from a to c is $0.2D_1$ and which represents one-half the major axis of the skewed ellipse. A line 53 forms an angle of 15° with the $Y-Y_1$ axis, which also extends through point 50. The straight edge 52 is positioned and repositioned several times such that the graduation b remains on the line 53 and the graduation c remains on the axis $X-X_1$ at all times. The resulting positions of a are plotted to give the ellipse curve 80 which may be described as a portion of a skewed ellipse which, in the horizontal cross-section, comprises the profile of the outer convex side of the curved portion 31 of the blades 21,22. Thus, location 32 in FIG. 1 and point 83 in FIG. 2 are fixed by their geometric relation to portion 31 and curve 80, respectively. If a straight line were constructed tangent to the curve at point 32, it would be parallel to plane 23. Referring to FIG. 3, by varying the length of the minor axis a-b in relation to the major axis a-c, and by changing the angle of the skew from 15°, minor shifts in the point of tangency can be made.

From this description, it will be appreciated that the shape of the outer curve 80 is similar to that of U.S. Pat. No. 4,359,311, except that the radius of curvature of the outer curve 80 is larger with respect to the rotor distance $D_1$ and the point 83 of tangency to the curve 88 by the curve 80 is at a slightly different point than U.S. Pat. No. 4,359,311.

As illustrated in FIG. 2, the curve 88 which has its center at 87 is tangent to the curve 80 at the highest point of the curve 80 and the radius $d_3$ through the points 83, 87 is at right angles to the plane 23 through the blade tip point 82 in the rotor center 24. In the preferred embodiment, $d_3 = 0.775D_1$. The curve 88 extends to the point 41 where it terminates a distance $d_4$ along its arc of curvature of $0.025D_1$ from the plane 23 which passes through the points 82 and the rotor center 24.

The distance $d_2$ from the point 82 located on vertical line 84 to the point 86 located on radius line 85 is $d_2 = 0.151D_1$. Although the shaft 28 preferably has a diameter $D_3 = 0.1D_1$, there is plenty of room left for an even larger size shaft, if so desired. Applicant's tests have shown that a similar rotor showed no appreciable loss in efficiency due to the constriction of the wind passage through the rotor blades 21,22 and the size of the shaft 28. However, applicant has noticed that if the air passage in the vicinity of the shaft 28 is completely blocked, there is a significant drop in efficiency.

The rotor blades 21,22 and the shaft 28 should be smooth. All rotor blade measurements are to the convex surfaces of the rotor blades 21,22. The maximum depth $d_5$ of the curve 88 is preferably $0.2D_1$.

By way of illustration, measurements for a preferred embodiment of the rotor 20 and the rotor assembly 18 are provided below, all measurements being given in terms of $D_1$ of the rotor 20, which is the diameter of the circle formed by the outer edges 25 of the rotor blades 21,22:

| | |
|---|---|
| $D_1 = D_1$ | $d_6 = 1.5D_1$ |
| $D_2 = 1.05D_1$ | $d_7 = 0.125D_1$ |
| $D_3 = 0.1D_1$ | $d_8 = 0.275D_1$ |
| $D_4 = D_1$ | $d_9 = 0.125D_1$ |
| $d_1 = 0.133D_1$ | $d_{10} = 0.4D_1$ |
| $d_2 = 0.151D_1$ | $d_{11} = 0.067D_1$ |
| $d_3 = 0.775D_1$ | $d_{12} = 0.8D_1$ |
| $d_4 = 0.025D_1$ | $d_{13} = 0.575D_1$ |
| $d_5 = 0.2D_1$ | $d_{14} = 1.43D_1$ |

Although the design for the blade tip in the preferred embodiment is nearly identical to that described in U.S. Pat. No. 4,359,311, the blade tip section of the rotor can be either larger or smaller in relation to the rotor diameter. Further, although the connecting curve 88 toward the rotor center is a curve of radius $d_3 = 0.775D_1$ with its concave side facing the rotor center 24, the curve can be of any radius that will trace an arc of a circle, which if extended, would cross the plane 23 illustrated in FIG. 1. Also, the curve 88 can have various radii, providing each section of the curve is concave on a side facing the rotor center 24 and the end of the curve crosses the plane 23. The curve from the general area of the point 83 toward the rotor center can also be a substantially straight line. The line can be parallel to the plane 23 or can be at an angle so as to cross the plane 23. The location of the inside edge 41 of the blades 21,22 in the preferred embodiment, as illustrated in FIG. 2, is the optimum location for the particular geometric design shown. However, it will be appreciated that if any of the other configurations are selected for the curve 88, the inner edge 41 might be located at other positions. If the equivalent of the curve 88 is a straight line, the curve 80 should be extended in the area 83 to a new point of tangency with the straight line.

The operation of the rotor of the present invention as the applicant understands it will now be described with particular reference to FIG. 1.

Wind traveling in a direction 89 relative to the rotor 20 enters the rotor 20 and follows path 90, 91, 92, and 94 through the rotor. Wind following the path 90 over the convex side of the curves 31,33 creates a suction which creates a pulling force on the blade 21, while wind following the path 92 creates a pushing force on the blade 21. Wind escapes along paths 93 and 91. Wind following the path 94 along the convex side of the blade 22 exerts a pushing force which has a slowing effect on the rotor 20. This is minimized to some extent by the fact that as the wind follows the curve of the blade 22, there is a small centrifugal wind force acting counter to the direct push of the wind. The centrifugal force is maximum at the point of sharpest curvature. The net effect of all the forces is a strong clockwise motion of the rotor. Referring back to the wind action on the blade 21, as the rotor turns while the wind moves forward along the blade 21, the rotor changes the direction of the air, tending to drag it toward the center of the rotor. The wind naturally resists a change in its direction, thus exerting a suction on the rotor blade in the direction of rotation. If the blade 21 is too long, that same suction will have an effect of slowing down the rotor. It therefore follows that the rotor will operate quite efficiently if the section 33 of the rotor blade were straight, providing the section made a favorable angle with the plane 23, and the cutoff point 41 were at the right location. Similarly, the blade section 33 could be on a curve of different radius than the curve 88, as shown, although it is believed that the curvature shown in FIG. 2 gives better efficiency than any other configuration.

Illustrated in FIGS. 4–9 is a rotor assembly embodying the principles of the Savonius-type rotor of the present invention. As illustrated in FIGS. 4–9, the rotor 20 is mounted with its axis vertical. The rotor 20 might be either a two blade or a three blade rotor, but the preferred embodiment is a two blade rotor, as previously described. The three blade rotor of U.S. Pat. No. 4,359,311 is less efficient than the two blade rotor herein described, but it exhibits somewhat smoother power. However, the two blade rotor is selected in the preferred embodiment herein because of its greater efficiency. When the two blade rotor is used with a vertical augmenting deflector plate 101 in front, its action is greatly improved to the point that vibration inherent in the two blade design is no longer an important consideration. Moreover, the power output is increased. Also, the two blade rotor will self-start at full load, regardless of the static orientation of the rotor blades. The height $D_4$ of the rotor 20 in the preferred embodiment is $D_4=D_1$.

In this relatively small Savonius-type rotor assembly, the structural framework is relatively simple. The preferred embodiment of support structure 19 is shown in FIGS. 4 and 5. A tower 23 with multiple legs is attached to stationary tube 29 near its center and extends to the ground. Stationary tube 29, which is concentric with central vertical axis 24 of rotor 20, extends almost half way up the height of the rotor and has thrust bearing 30 at its top. Central shaft 28, which is fastened solidly to rotor 20 and turns with it, rotates in thrust bearing 30. Thrust bearing 30 holds central shaft 28 in position. Central shaft 28 extends through thrust bearing 30 into stationary tube 29 and also rotates in bearing 34 which is located at the bottom of stationary tube 29. Central shaft 28 extends a short distance below stationary tube 29 to flexible coupling 36 which is concentric with central vertical axis 24. Torque tube 38, also concentric with central vertical axis 24, extends from flexible coupling 36 to alternators or mechanical equipment at ground level. Torque tube 38 takes no bending moment so it can be quite small.

Figure 8:
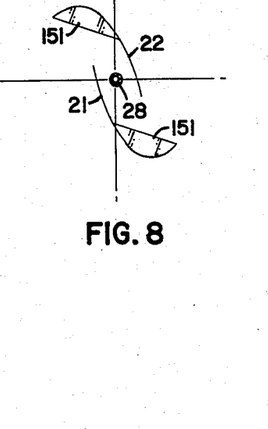
FIG. 8 is a cross-sectional view along line 8—8 of the embodiment shown in FIG. 4.
Figure 9:
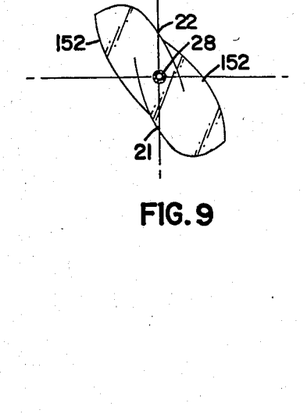
FIG. 9 is a cross-sectional view along line 9—9 of the embodiment shown in FIG. 4.

In the preferred embodiment shown in FIGS. 4 and 5, the rotor blades 21, 22 are held in shape by flat braces 151 and 152. Flat braces 151 hold the tips of rotor blades 21, 22 in shape. FIG. 8 further illustrates the positioning of flat braces 151 with respect to blades 21, 22. Flat brace 152 is made of stiffer material than braces 151 as brace 152 is the principal support for the rotor. Flat brace 152 is firmly fastened to shaft 28 whereby brace 152 is the main support of the weight of the rotor in addition to transmitting the torque from the rotor blades 21, 22 to shaft 28. Flat brace 152 provides support without the undesirable effect of power loss due to air friction at the periphery that a full size round disc similar to end caps 26, 27 would cause if placed at the location of brace 152. FIG. 9 further illustrates the positioning of flat brace 152 with respect to blades 21, 22.

In the preferred embodiment shown in FIGS. 4 and 5, support for rotor 20 is near the center of the rotor at thrust bearing 30, which is at the top of stationary tube 29. Therefore, stationary tube 29 takes almost all of the bending moment so that central shaft 28 only needs to resist bending moments in a minor amount. It will be appreciated that stationary tube 29 can also be placed completely below the rotor.

The vertical augmenting deflector plate 101 of deflector assembly 100 is shown in FIGS. 4-7. The surface facing the wind is preferably covered by a thin layer of aluminum for smoothness. Deflector plate 101 is held in place by hollow round deflector tube 102, which is fastened solidly along the height of deflector plate 101 on the side of deflector plate 101 which does not face the wind. Deflector tube 102 provides strength and stiffness to hold deflector plate 101 in the correct position. Deflector tube 102 extends beyond the bottom of deflector plate 101 and is held in position by support arms 104 and 106. Support arms 104, 106 are substantially parallel to the ground and are connected to stationary tube 29 below rotor 20 by means of antifriction bearings 108, 110. The opposite ends of support arms 104, 106 contain antifriction bearings 112, 114, respectively. Deflector tube 102 is connected to antifriction bearings 112, 114 and thus deflector tube 102 and attached deflector plate 101 are rotatable about a vertical axis concentric with the center of deflector tube 102. In the preferred embodiment, support arms 104, 106 are made more rigid by two short cylinders 116, 118 which are welded between support arms 104, 106 and by diagonal brace 119 which is also welded between support arms 104, 106.

In the preferred embodiment, deflector plate 101 preferably extends beyond the top and the bottom of rotor 20 so that the total height $d_6$ of the deflector plate 101 is $d_6=1.5D_1$. The location of the edge of the deflector plate 101 which is closest, in normal operation, to central vertical axis 24 of rotor 20 is critical. Normal operation refers to operation of rotor assembly 18 at wind speeds below a predetermined speed. If a horizontal line is drawn through central vertical axis 24 parallel to the wind direction, the edge of the rotor which is closest to that line is $d_7$ to the side of that line with $d_7=0.125D_1$. If a horizontal line is drawn through central vertical axis 24 of rotor 20 and the edge of deflector plate 101 which is closest, in normal operation, to the axis and another horizontal line is drawn through central vertical axis 24 parallel to the wind direction, the angle between the two lines in the preferred embodiment is 12.6°. The horizontal distance $d_{13}$ between the edge of the deflector plate that is closest, in normal operation, to central vertical axis 24 and central vertical axis 24 is $d_{13}=0.575D_1$ in the preferred embodiment.

In the preferred embodiment, the deflector plate 101 is a flat plate with a curve on one edge, as shown in FIGS. 4-7. The curved portion of deflector plate 101 is closest, in normal operation, to central vertical axis 24 of rotor 20. The curved portion forms a generally concave surface with respect to central vertical axis 24 and forms a 90° arc of a circle. In the preferred embodiment, the width $d_8$ of the flat portion is $d_8=0.275D_1$. The curved portion has a radius of $d_9=0.125D_1$ so that the total width $d_{10}$ of deflector plate 101 is $d_{10}=0.4D_1$. In the preferred embodiment, deflector tube 102 is attached to deflector plate 101 on the concave side of the curved portion of deflector plate 101. Deflector tube 102 has a diameter of $d_{11}=0.067D_1$.

Figure 7:
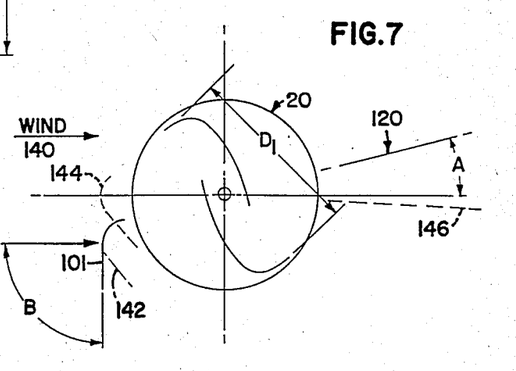
FIG. 7 is a top diagrammatic view of the embodiment shown in FIG. 4.

The flat portion of deflector plate 101 makes an angle B with the direction of the wind, as shown in FIG. 7. In the preferred embodiment, angle B is 90°. If angle B were less than 90°, there would be a small increase in power; angle B should probably not, however, be less than 70°. If angle B is made less than 90°, a corresponding angular reduction should be made in the central angle of the curved portion of deflector plate 101. Also, the dimension $d_7$ would be affected because the deflector plate 101 would have to be adjusted with respect to rotor 20. Additionally, the fantail would need to be increased in size to maintain the proper angle A discussed below.

FIGS. 4-7 show fantail member 120. The purpose of fantail member 120 is to position deflector plate 101 so that the flat portion makes an angle B with the direction of the wind. Fantail member 120 extends outward from stationary tube 29 and is attached to stationary tube 29 at antifriction bearings 108, 110. Fantail member 120 has an outer portion 122 and an inner portion 124. Inner portion 124 is composed of support arms 126, 128 which are separated by a cross-beam 125. Air is free to flow through inner portion 124 of fantail member 120. Outer portion 122 of fantail member 120 is composed of support arms 126, 128 which are separated by an opaque material such that wind is not allowed through outer portion 122. The height of fantail member 120 gradually increases from the edge connected to the antifriction bearings 108, 110 to the edge which is furthest from rotor 20. In the preferred embodiment, the height $d_{12}$ of the edge of the fantail member 120 which is furthest from rotor 20 is $d_{12}=0.8D_1$. Fantail member 120 extends at a downward angle from stationary tube 29 in the preferred embodiment. The length $d_{14}$ of fantail member 120 is $d_{14}=1.43D_1$ measured from the central vertical axis 24 to the edge of fantail member 120 which is furthest from rotor 20.

In the preferred embodiment, as shown in FIGS. 4-7, the support arms 104, 106 and the support arms 126, 128 are connected to the antifriction bearings 108, 110 so that fantail member 120 and deflector assembly 100 are freely rotatable about central vertical axis 24 of rotor 20 in a fixed relationship to each other, i.e., the angle between support arms 104, 106 and support arms 126, 128 is always the same. As mentioned before, in the preferred embodiment, the flat portion of deflector plate 101 should make a 90° angle with the direction of the wind. Wind turbines with fantails, but without deflector plates, usually have the fantail at an angle of substantially 0° with the direction of the wind. In the present invention, however, the action of the wind against deflector plate 101 is such that there is always a force on the deflector plate causing torque in yaw, so fantail member 120 is connected to antifriction bearings 108, 110 in such a way as to make an angle A with the wind direction. Having fantail member 120 at an angle with the wind balances the torque in yaw on deflector plate 101 and keeps the flat portion of deflector plate 101 of the preferred embodiment constantly oriented perpendicular to the direction of the wind in normal operation. The size of angle A is important. If angle A is designed to be too large, the action of the fantail member 120 is too sluggish and the response to a change of wind direction is not quick enough. Also, due to inertia, there can be some oscillation from the correct position. If angle A is designed to be too small, the action of the fantail member 120 is precise, but it takes a larger fantail and the speed control apparatus, discussed hereafter, becomes less effective. In the preferred embodiment, angle A is between 15° and 20°. In the most preferred embodiment, angle A is 18°.

Figure 10:
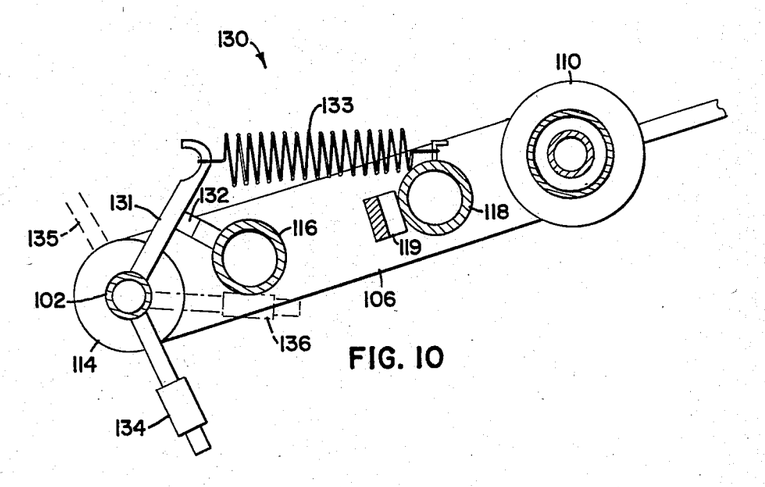
FIG. 10 is an enlarged cross-sectional view along line 10—10 of the embodiment shown in FIG. 4 and shows the speed control mechanism.

The preferred embodiment of the speed control apparatus 130 of the present invention is shown in FIG. 10. Apparatus 130 is located at the bottom of deflector assembly 100 as shown in FIG. 4. Arm 131 is attached to deflector tube 102. Arm 131 has a hook on the end that is not attached to tube 102. One end of spring 133 is connected to the hook on arm 131 and the other end of spring 133 is connected to a hook which is attached to the side of cylinder 118. Bumper arm 134 is also attached to deflector tube 102 and stop 132 is connected on one end to the side of cylinder 116 and has a bumper on its other end. The bumper material on bumper arm 134 and stop 132 is a tough fiber, perhaps rubberized and perhaps similar to the combination of materials found in the section of automobile tires near the rim. In normal operation when the wind is below a predetermined speed, spring 133, which is attached to deflector tube 102 through arm 131, holds arm 131 against stop 132 which in turn prevents tube 102 from rotating in antifriction bearings 112, 114. Thus deflector plate 101 is held in a position where the flat portion makes an angle of B with the wind direction in normal operation.

The operation of the present invention will now be described with particular reference to FIGS. 4, 5, 7 and 10. With deflector plate 101 in place, rotor 20 is able to self-start under a full load. Wind following the path 140 acts on fantail member 120 to rotate it about central vertical axis 24 to the position where fantail member 120 makes an angle A with the direction of the wind. When fantail member 120 rotates, deflector assembly 100 also rotates since they are both attached to antifriction bearings 108, 110. Thus, the rotation of fantail member 120 causes deflector plate 101 to be perpendicular to the direction of the wind.

Wind following path 140 enters rotor 20 and causes it to spin in a clockwise direction. Central shaft 28 which is attached to end cap 26 and rotor blades 21, 22 through flat brace 152 also spins in a clockwise direction in thrust bearing 30 at the top of stationary tube 29 and in bearing 34 at the bottom of stationary tube 29. This torque is transferred to torque tube 38 at flexible coupling 36. Torque tube 38 is attached to alternator or mechanical equipment at ground level.

When the wind speed is below the predetermined speed, spring 133 keeps arm 131 pressed against stop 132 and stops deflector tube 102 from rotating in antifriction bearings 112, 114 so that wind acting on the flat portion of deflector plate 101 is not allowed to rotate deflector plate 101 from its optimum position where the flat portion of plate 101 makes an angle B with respect to the direction of the wind. If the wind speed increases above the predetermined speed, the greater pressure on the flat portion of deflector plate 101 overcomes the force of spring 133 and rotates deflector tube 102 in antifriction bearings 112, 114 and thus rotates deflector plate 101 to position 142 shown in FIG. 7. The rotation of deflector plate 101 does two things. First, some of the wind following path 140 is deflected away from the most effective area of rotor 20. Second, rotating deflector plate 101 about the vertical axis of deflector tube 102 causes deflector assembly 100 to advance clockwise around central vertical axis 24 of rotor 20 to position 144 shown in FIG. 7 because of additional torque in yaw on deflector assembly 100. Position 144 is a less effective position for power production because the deflector plate 101 does not augment the action of rotor 20 as well in position 144 and can even have a negative effect on the action of rotor 20 in this position. It can be seen in FIG. 7 that when deflector plate 101 is moved to position 144, fantail member 120 moves to position 146. Thus, the rotation of deflector tube 102 and deflector assembly 100 slows the rotation of rotor 20 and protects rotor 20 from damage in high winds while still allowing rotor 20 to produce power.

If the wind pressure becomes too great, tube 102 will rotate to a position where arm 131 is moved to position 135 and bumper arm 134 is moved to position 136 where it is stopped by cylinder 116. This stops tube 102 from rotating any further in a counter-clockwise direction. This safety feature is necessary to prevent a very strong wind from rotating tube 102 to a point where the trailing edge of deflector plate 101 hits rotor 20.

Thus, an efficient vertical axis Savonius-type rotor is provided. Wind energy causes the rotor to turn and this motion is transported by means of a torque tube to alternators for producing electrical energy or mechanical equipment. The assembly includes an augmentor to increase the power output of the rotor. This assembly also includes a speed control apparatus so that the rotor can be unattended while it is operating. The speed control apparatus allows the rotor to withstand gale force winds without damage and produce power at the same time.

It is to be understood that even though numerous characteristics and advantages of the invention have been set forth in the foregoing description, together with details of the structure and function of the invention, the disclosure is illustrative only and changes may be made in detail, especially in matters of shape, size and arrangement of parts within the principles of the invention, to the full extent indicated by the broad general meaning of the terms in which the appended claims are expressed.

What is claimed is:

1. A Savonius rotor assembly for interacting with a moving fluid, comprising:
   (a) a support framework;
   (b) a rotor having top and bottom ends being mounted on the support framework for rotation about a central, vertically extending axis, the rotor having at least two blades;
   (c) a deflector member extending substantially along the height of the rotor and positioned to one side of a horizontal line drawn through the central, vertically extending axis of the rotor parallel to the direction of the fluid flow, the deflector member having an outer edge and an inner edge, the inner edge being closest to the horizontal line drawn through the central, vertically extending axis, the deflector member further having a straight portion and a curved portion, the straight portion extending from the outer edge to the curved portion and oriented at 90° relative to the horizontal line drawn through the central, vertically extending axis, the curved portion extending from the inner edge to the straight portion, the curved portion defining a surface generally concave with respect to the central vertically extending axis;
   (d) fantail means interconnected to the deflector member and extending outward from the support framework for positioning the deflector member on the side of the rotor facing the direction from which the fluid is flowing, a longitudinal edge of the fantail means making an angle with the direction of the fluid flow, the fantail means, in normal operation, disposed on the opposite side of the horizontal line drawn through the central, vertically extending axis as the deflector member; and
   (e) rotatable mounting means rotatably mounting the deflector member and the fantail means to the support framework for rotation of the deflector member and the fantail means about the central, vertically extending axis of the rotor in a fixed relationship to each other.

2. A Savonius rotor assembly in accordance with claim 1, wherein the deflector member extends beyond the top and the bottom of the rotor.

3. A Savonius rotor assembly in accordance with claim 1, wherein the rotatable mounting means includes:
   (a) first bearing means located on the support framework for providing rotational movement about the central, vertically extending axis of the rotor;
   (b) first connecting means for connecting the deflector member to the first bearing means; and
   (c) second connecting means for rigidly connecting the fantail means to the first bearing means, whereby the deflector member and the fantail means rotate in a fixed relationship about the central, vertically extending axis of the rotor.

4. A Savonius rotor assembly in accordance with claim 3, wherein the first bearing means include a first plurality of anti-friction bearings disposed concentrically about the central, vertically extending axis of the rotor.

5. A Savonius rotor assembly in accordance with claim 3, wherein the first connecting means includes:
   (a) a substantially vertical tube rigidly connected to the deflector member, one end of the tube extending below the bottom of the deflector member; and
   (b) a rigid connecting member with one end connected to the first bearing means and the other end connected to the tube.

6. A Savonius rotor assembly in accordance with claim 1, wherein the angle the longitudinal edge of the fantail means makes with the direction of fluid flow is between 15° and 20°.

7. A Savonius rotor assembly for interacting with a moving fluid, comprising:
   (a) a support framework;
   (b) a rotor having top and bottom ends being mounted on the support framework for rotation about a central, vertically extending axis, the rotor having at least two blades;
   (c) a vertically extending deflector member, having a width and a length, being displaced from the rotor and extending substantially along the height of the rotor;
   (d) fantail means interconnected to the deflector member and extending outward from the support framework for positioning the deflector member on the side of the rotor facing the direction from which the fluid is flowing, a longitudinal edge of the fantail means making an angle with the direction of the fluid flow; and
   (e) rotatable mounting means rotatably mounting the deflector member and the fantail means to the support framework for rotation of the deflector member and the fantail means about the central, vertically extending axis of the rotor in a fixed relationship to each other; and
   (f) speed control means interconnected to the deflector member for slowing down the rotation of the rotor in a strong fluid flow, the speed control means including:
      (i) rotating means rotatably supporting the deflector plate for rotational motion about a substantially vertical axis; and
      (ii) biasing means cooperating with the rotating means and exerting a predetermined force for normally keeping the width of the deflector member at a substantially 90° angle to the direction of fluid flow and for allowing the deflector member in a strong fluid flow to rotate to a less effective position where the width of the deflector member does not make an angle of 90° with the direction of the fluid flow so that some of the fluid flow is deflected away from the rotor, which in turn causes the deflector member and the fantail means to rotate about the central, vertically extending axis of the rotor to a position where even more of the fluid flow is directed away from the rotor.

8. A Savonius rotor assembly in accordance with claim 7, wherein the deflector member is positioned to one side of a horizontal line drawn through the central, vertically extending axis of the rotor parallel to the direction of the fluid flow, the deflector member having an outer edge and an inner edge, the inner edge being closest to the horizontal line drawn through the central, vertically extending axis.

9. A Savonius rotor assembly in accordance with claim 8, wherein the deflector member has an outer surface facing away from the central, vertically extending axis and an inner surface facing toward the central, vertically extending axis, the deflector member further having a straight portion and a curved portion, the straight portion extending from the outer edge to the curved portion, and the curved portion extending from the inner edge to the straight portion, the inner surface of the curved portion being generally concave with respect to the central, vertically extending axis.

10. A Savonius rotor assembly in accordance with claim 9, wherein the rotating means is disposed proximate the inner surface of the deflector member.

11. A Savonius rotor assembly in accordance with claim 7, wherein the deflector member extends beyond the top and the bottom of the rotor.

12. A Savonius rotor assembly in accordance with claim 7, wherein the rotatable mounting means includes:
   (a) first bearing means located on the support framework for providing rotational movement about the central, vertically extending axis of the rotor;
   (b) first connecting means for connecting the deflector member to the first bearing means; and
   (c) second connecting means for rigidly connecting the fantail means to the first bearing means, whereby the deflector member and fantail means rotate in a fixed relationship about the central, vertically extending axis of the rotor.

13. A Savonius rotor assembly in accordance with claim 12, wherein the first bearing means include a first plurality of anti-friction bearings disposed concentrically about the central, vertically extending axis of the rotor.

14. A Savonius rotor assembly in accordance with claim 12, wherein the first connecting means includes:
   (a) a substantially vertical tube rigidly connected to the deflector member, one end of the tube extending below the bottom of the deflector member; and
   (b) a rigid connecting member with one end connected to the first bearing means and the other end connected to the tube.

15. A Savonius rotor assembly in accordance with claim 14, wherein the rotating means includes:
   (a) a second plurality of anti-friction bearings connecting the tube to the rigid connecting member.

16. A Savonius rotor assembly for interacting with a moving fluid, comprising:
   (a) a support framework;
   (b) a rotor having top and bottom ends being mounted on the support framework for rotation about a central, vertically extending axis, the rotor having two blades disposed symmetrically about the central, vertically extending axis, each of the blades having an outer edge and an inner edge with respect to the central, vertically extending axis, the outer edges of the blades lying in a circle defining the diameter of the rotor, the blades having a first curved portion and a second curved portion, the first curved portion beginning at the outer edge and terminating at the second curved portion with the first curved portion defining a surface generally concave with respect to the central, vertically extending axis, the first curved portion having a radius of curvature which becomes progressively less from the outer edge to the second curved portion, the second curved portion coming progressively closer to a plane containing the central, vertically extending axis and the outer edge of the blade as the second curved portion extends from the first curved portion to the inner edge of the blade, the maximum displacement of the blades from the plane being less than one-quarter of the diameter of the rotor;
   (c) a deflector member extending substantially along the height of the rotor;
   (d) fantail means interconnected to the deflector member and extending outward from the support framework for positioning the deflector member on the side of the rotor facing the direction from which the fluid is flowing, a longitudinal edge of the fantail means making an angle with the direction of the fluid flow;
   (e) rotatable mounting means rotatably mounting the deflector member and the fantail means to the support framework for rotation of the deflector member and the fantail means about the central, vertically extending axis of the rotor in a fixed relationship to each other; and
   (f) speed control means interconnected to the deflector member for slowing down the rotation of the rotor in a strong fluid flow, the speed control means including:
      (i) rotating means rotatably supporting the deflector plate for rotational motion about a substantially vertical axis; and
      (ii) biasing means cooperating with the rotating means and exerting a predetermined force for normally keeping the width of the deflector member at a substantially 90° angle to the direction of fluid flow and for allowing the deflector member in a strong fluid flow to rotate to a less effective position where the length of the deflector member does not make an angle of 90° with the direction of fluid flow so that some of the fluid flow is deflected away from the rotor, which in turn causes the deflector member and the fantail means to rotate about the central, vertically extending axis of the rotor so that even more fluid flow is directed away from the rotor.

17. A Savonius rotor assembly in accordance with claim 16, wherein the deflector member is positioned to the side of a horizontal line drawn through the central, vertically extending axis parallel to the direction of the fluid flow, the deflector member having an outer edge and an inner edge, the inner edge being closest to the horizontal line drawn through the central, vertically extending axis.

18. A Savonius rotor assembly in accordance with claim 17, wherein the deflector member further has a straight portion and a curved portion, the straight portion extending from the outer edge to the curved portion and the curved portion extending from the inner edge to the straight portion, the curved portion defining a surface generally concave with respect to the central, vertically extending axis.

19. A Savonius rotor assembly in accordance with claim 16, wherein the deflector member extends beyond the top and the bottom of the rotor.

20. A Savonius rotor assembly in accordance with claim 16, wherein the angle the longitudinal edge of the fantail means makes with the direction of fluid flow is between 15° and 20°.

21. A Savonius rotor assembly for interacting with a moving fluid, comprising:
(a) a support framework;
(b) a rotor having top and bottom ends being mounted on the support framework for rotation about a central, vertically extending axis, the rotor having two blades disposed symmetrically about the central, vertically extending axis, each of the blades having an outer edge and an inner edge with respect to the central, vertically extending axis, the outer edges of the blades lying in a circle defining the diameter of the rotor, the blades having a first curved portion and a second curved portion, the first curved portion beginning at the outer edge and terminating at the second curved portion with the first curved portion defining a surface generally concave with respect to the central, vertically extending axis, the first curved portion having a radius of curvature which becomes progressively less from the outer edge to the second curved portion, the second curved portion coming progressively closer to a plane containing the central, vertically extending axis and the outer edge of the blade as the second curved portion extends from the first curved portion to the inner edge of the blade, the maximum displacement of the blades from the plane being less than one-quarter of the diameter of the rotor;
(c) a vertically extending deflector member, having a width and a length, being displaced from the rotor and extending substantially along the height of the rotor, the deflector member positioned to one side of a horizontal line drawn through the central, vertically extending axis of the rotor parallel to the direction of the fluid flow;
(d) fantail means interconnected to the deflector member and extending outward from the support framework for positioning the deflector member on the side of the rotor facing the direction from which the fluid is flowing, a longitudinal edge of the fantail means making an angle with the direction of the fluid flow;
(e) rotatable mounting means rotatably mounting the deflector member and the fantail means to the support framework for rotation of the deflector member and the fantail means about the central, vertically extending axis of the rotor in a fixed relationship to each other; and
(f) speed control means interconnected to the deflector member for slowing down the rotation of the rotor in a strong fluid flow.

22. A Savonius rotor assembly in accordance with claim 7, wherein the rotor blades each have an inner edge and an outer edge, the inner edges being closest to the central, vertically extending axis, the blades connected to the rest of the rotor so that fluid can cross between the inner edges of the blades.

* * * * *